Sept. 15, 1936.  J. C. HOCHMAN  2,054,420
COMBINATION DRAFTING IMPLEMENT
Filed Aug. 5, 1933
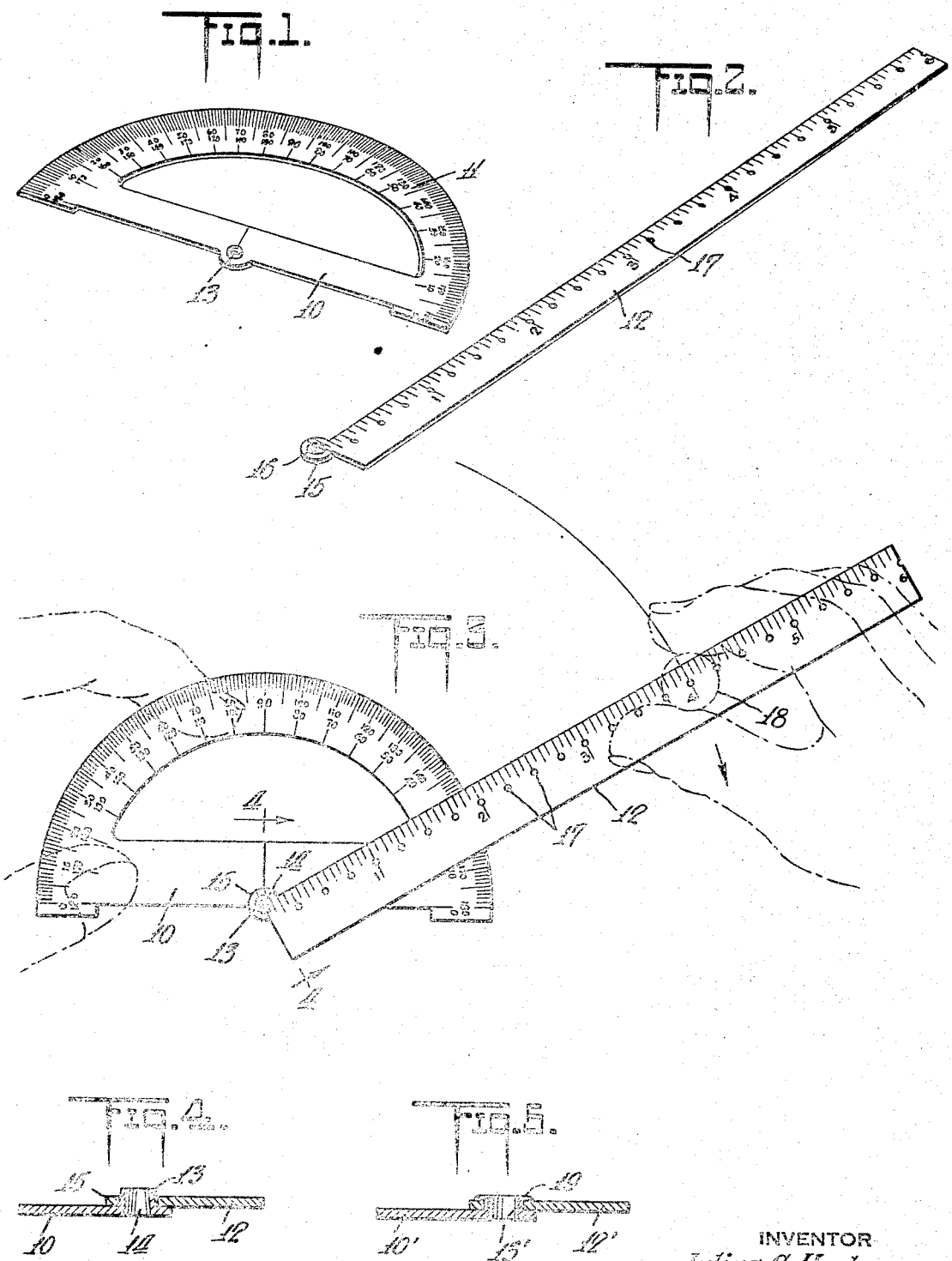
INVENTOR
Julius C. Hochman
BY
Dean, Fairbank, Hirsch & Foster
ATTORNEYS Patented Sept. 15, 1936

2,054,420

UNITED STATES PATENT OFFICE 2,054,420

COMBINATION DRAFTING IMPLEMENT

Julius C. Hochman, New York, N. Y., assignor to Eagle Pencil Co. Inc., New York, N. Y., a corporation of Delaware Application August 5, 1933, Serial No. 683,740

3 Claims. (Cl. 33—75)

My present invention relates to combination drafting implements and more especially to an implement adapted to serve as required as a scale, an indicating protractor or a compass.

An object of the invention is to provide an implement of the above type which may be manipulated with the utmost facility and which is devoid of any mechanism apt to become jammed on the one hand or loosened by wear on the other hand, and which implement will therefore be useful indefinitely without impairment of its accuracy.

Another object is to provide an implement of the above type which can be blanked from sheet metal stock by the use of a punch-press and without the need for further manufacturing operations, and which implement is therefore of utmost simplicity and low cost.

Other objects will be in part obvious and in part pointed out hereinafter.

In the accompanying drawing in which are shown one or more of various possible embodiments of the several features of the invention, Fig. 1 is a perspective view of the protractor element, Fig. 2 is a perspective view of the scale element, Fig. 3 is a plan view illustrating the use of the implement as a compass, Fig. 4 is a detail sectional view through line 4—4 of Fig. 3, and Fig. 5 is a view similar to Fig. 4 of a modification.

Referring now to the drawing, there is shown in Fig. 1 a protractor element including the usual diameter or base plate 10 integral with the generally semi-circular arc plate 11 on which are the usual angle scale markings. In Fig. 2 is shown a scale element 12 with the usual linear scale markings thereon. The respective protractor and scale elements of Figs. 1 and 2 are preferably distinct, so that each can be used independently of the other according to conventional practice.

According to the present invention, the elements of Figs. 1 and 2 are constructed or conformed for co-ordination with each other by a suitable pivot connection, permitting pivotal adjustment or displacement of the scale, with its scale bearing edge extending radially of the protractor in all positions thereof, for the purposes hereinafter set forth.

A preferred simple pivot arrangement disclosed in the drawing, comprises a rivet conformation concentric and unitary with the protractor. The rivet is preferably drawn or molded from the material of the bar 10, which is perforated at 14 to afford the material for the cylindrical rivet wall 13 which rises from the upper face of the protractor element and is preferably formed with a slight taper and in the order of ¼ inch in diameter.

The scale element 12 has at its upper left edge a unitary ear 15 extending obliquely outward therefrom in the plane of the scale and having a circular aperture 16 therein which is bisected by the continuation of the scale bearing edge of the scale element. Aperture 16 is preferably about ⅛ inch in diameter to fit snugly about the tapered rivet wall 13 on the protractor element, when the two elements are co-ordinated as shown in Figs. 3 and 4 with the scale element resting flat upon the protractor element.

When the ear on the scale is positioned over the rivet wall on the protractor as best shown in Fig. 3, it will immediately be seen that the assembly provides an indicating protractor. With the protractor element held in fixed position, the scale can be pivotally displaced as desired for any angular relation thereof, with the scale element extending radially of the protractor element.

Where the implement is, as is preferably the case, also to serve as a compass, the scale element is provided as shown, at suitable scale divisions, with a series of perforations 17 therein, which are useful for describing circular arcs of selected radius and given angular values. For this purpose, the sharp point of a pencil 18 is inserted through any selected aperture 17, and with the left hand holding the protractor element in place, the pencil point is advanced to urge the scale around the pivot center 13, either completely or through the desired length of arc. The pivot 13—15 retains the scale with sufficient security in describing an arc or circle to dispense with the need for even touching the scale during such operation, except by the pencil point as set forth.

It will be noted that in the manner set forth, a circle or arc of desired radius can be readily described, without mutilation of the paper or chart by a center point. Only the flat face of the protractor element and a portion of the flat face of the scale element touches the paper, so that there is no danger of mutilation by any sharp edge or point, the sharp edge of the rivet wall 13 extending upward from the protractor element.

While each of the two elements of the combination drafting implement can be made of any suitable molded material, transparent, translucent or opaque, commonly used for protractors and scale, it is preferred to make each of these parts as a unitary blank of thin gauge sheet metal stock preferably about .020" in thickness.

In the alternative embodiment of Fig. 5, the rivet wall 13' unitary with the protractor element 10' is rolled over at its edge 19 to afford a permanent assembly of protractor and scale, used as an indicating protractor or as a compass in the same manner set forth in the foregoing.

In both embodiments, it is obvious that the scale could extend beyond what is shown as the lower extremity thereof in Figs. 2 and 3, the ear 15 in that case extending outward from the scale bearing edge and from between the ends of the latter.

It will, of course, be understood that within the scope of the broader claims, pivot arrangements between the protractor and scale elements, different from those set forth could be employed, but the arrangement described commends itself by reason of its simplicity and low cost.

It will thus be seen that there is herein described an article in which the several features of this invention are embodied, and which article in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

1. A combination scale, compass and indicating protractor comprising a protractor element and a scale element of uniform thickness superposed thereover, said protractor element having a beam of width substantially the same as that of said scale, said elements having complementary cooperating pivot conformations unitary with the respective elements and which permit rotary movement of the scale about the center of said protractor the pivot conformation of said scale constituting a small circular aperture through the thickness thereof, and that on the protractor constituting a part circular in cross-section rising from the protractor and extending through said aperture, said scale element having guide perforations adapted to accommodate a pencil point in describing an arc of selected radius about the pivot conformation of the protractor.

2. A combination drafting implement comprising a protractor element having a hollow rigid conformation unitary therewith and at the center thereof, and a scale of uniform thickness having a perforated ear therethrough and near one end thereof and encircling said rigid conformation, with the edge of said scale element extending outward from the hollow conformation of said protractor element, said scale having equidistant perforations to accommodate a pencil point in describing any arc of selected radius concentrically with said protractor said scale intersecting the arc of said protractor at a distance from said hollow conformation several times greater than the width of said scale.

3. A combination drafting implement comprising a protractor element having a hollow rivet wall conformation unitary therewith and at the center thereof, a scale element having an ear conformation unitary therewith and in the plane of said scale element, presenting a circular aperture fitting said rigid conformation and bisected by the continuation of the scale element, said rivet wall turned over at its rim to assemble the two elements in pivotal correlation to afford a relatively free running bearing.

JULIUS C. HOCHMAN.